United States Patent
Fernsler

(10) Patent No.: US 6,252,361 B1
(45) Date of Patent: Jun. 26, 2001

(54) HIGH-VOLTAGE POWER SUPPLY DISABLING CIRCUIT FOR VIDEO DISPLAY

(75) Inventor: Ronald Eugene Fernsler, Indianapolis, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/419,387

(22) Filed: Oct. 15, 1999

(51) Int. Cl.[7] .................................................. H01J 29/70
(52) U.S. Cl. ............................................. 315/411; 315/384
(58) Field of Search .................................. 315/411, 384, 315/386, 381; 358/220, 60

(56) References Cited

U.S. PATENT DOCUMENTS

| | | | |
|---|---|---|---|
| 4,763,046 | 8/1988 | Sheikolslami et al. | 315/381 |
| 4,820,959 | 4/1989 | Griffey | 315/384 |
| 5,010,281 | 4/1991 | Rodriquez-Cavazos | 315/411 |
| 5,036,260 | * 7/1991 | George | 315/384 |
| 5,084,657 | 1/1992 | Ueda | 315/381 |
| 5,111,119 | 5/1992 | Truskalo et al. | 315/386 |
| 5,418,705 | 5/1995 | Smith et al. | 363/56 |

* cited by examiner

Primary Examiner—Don Wong
Assistant Examiner—James Clinger
(74) Attorney, Agent, or Firm—Joseph S. Tripoli; Harvey D. Fried; Sammy S. Henig

(57) ABSTRACT

An ultor voltage switching power supply for a cathode ray tube is energized by a low voltage switching power supply. A switching transistor of the ultor voltage switching power supply is disabled when a screen of the cathode ray tube is blanked. An anode capacitance of the cathode ray tube that develops the ultor voltage discharges via a bleeder resistor, when the switching transistor is disabled. As a result, a transient decrease occurs in the ultor voltage. The decreased ultor voltage tends to maintain the screen blanked.

10 Claims, 3 Drawing Sheets

HIGH-VOLTAGE POWER SUPPLY DISABLING CIRCUIT FOR VIDEO DISPLAY

FIELD OF THE INVENTION

This invention relates generally to a high-voltage power supply for a video display apparatus.

BACKGROUND

A multi-frequency video display monitor/television receiver having a cathode ray tube (CRT) is capable of operating at, for example, a horizontal deflection frequency selected from a range of frequencies in accordance with, for example, a selection controlled by a user, referred to as mode change. It may be advantageous to keep the ultor voltage of the CRT present, during the mode change, so that the picture will return as soon as possible after the mode change. It may also be desirable to disable, for example, the horizontal deflection current for protecting a horizontal output transistor, during the mode change. In order to reduce the possibility of phosphor burns of the CRT screen in the absence of horizontal deflection, it may be desirable to blank the CRT screen, during the mode change.

In the event of improper blanking adjustment, for example, during a field service, the CRT screen might not be completely blanked, during the mode change. Therefore, a CRT screen burn could occur that causes damage to the CRT. It may be desirable to reduce the possibility of improper adjustment.

In carrying out an inventive feature, an ultor voltage switching power supply is inhibited from switching, from a time that occurs, for example, approximately 120 millisecond prior to an interval when the deflection current is disabled and during the interval when the deflection current is disabled. An ultor electrode capacitance of the CRT is partially discharged via a large bleeder resistor, when the ultor voltage switching power supply is inhibited from switching. As a result, the ultor voltage exhibits a transient decrease to a fraction of its normal operation value. The transient decrease, advantageously, maintains the CRT screen blanked even when improper screen blanking control occurs.

SUMMARY

A video display apparatus, embodying an inventive feature, includes an ultor voltage power supply for generating an ultor voltage at an ultor electrode of a cathode ray tube. A screen of the cathode ray tube is blanked, when a change occurs in a mode of operation of the video display apparatus. The ultor voltage power supply is disabled, when the mode change occurs. A transient decrease in a magnitude of the ultor voltage is produced, when the ultor voltage power supply is disabled.

DESCRIPTION OF THE PREFERRED EMBODIMENTS

Figure 1A:
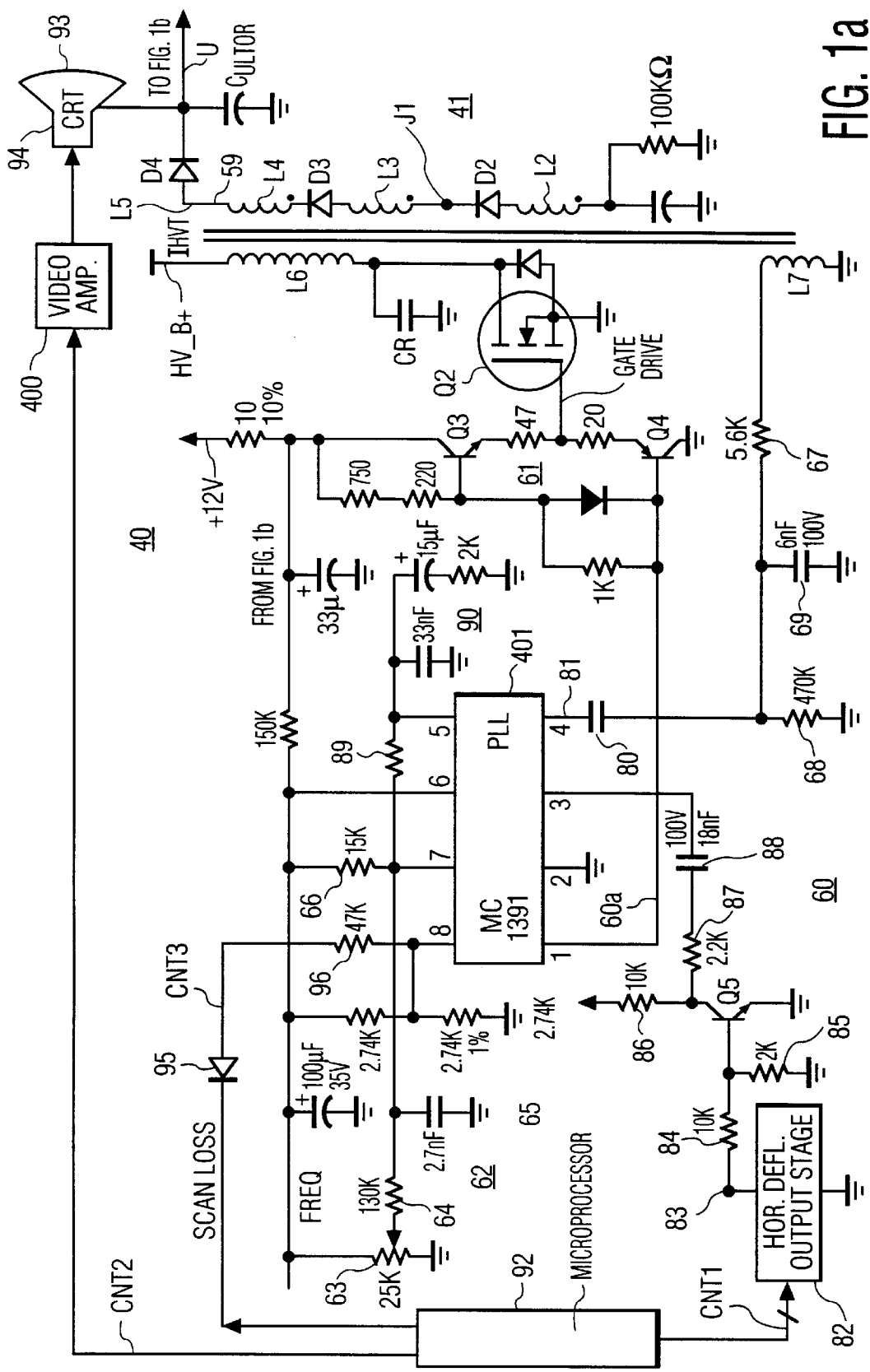
FIG. 1A illustrates a high-voltage power supply that is selectively disabled, in accordance with an inventive feature.
Figure 1B:
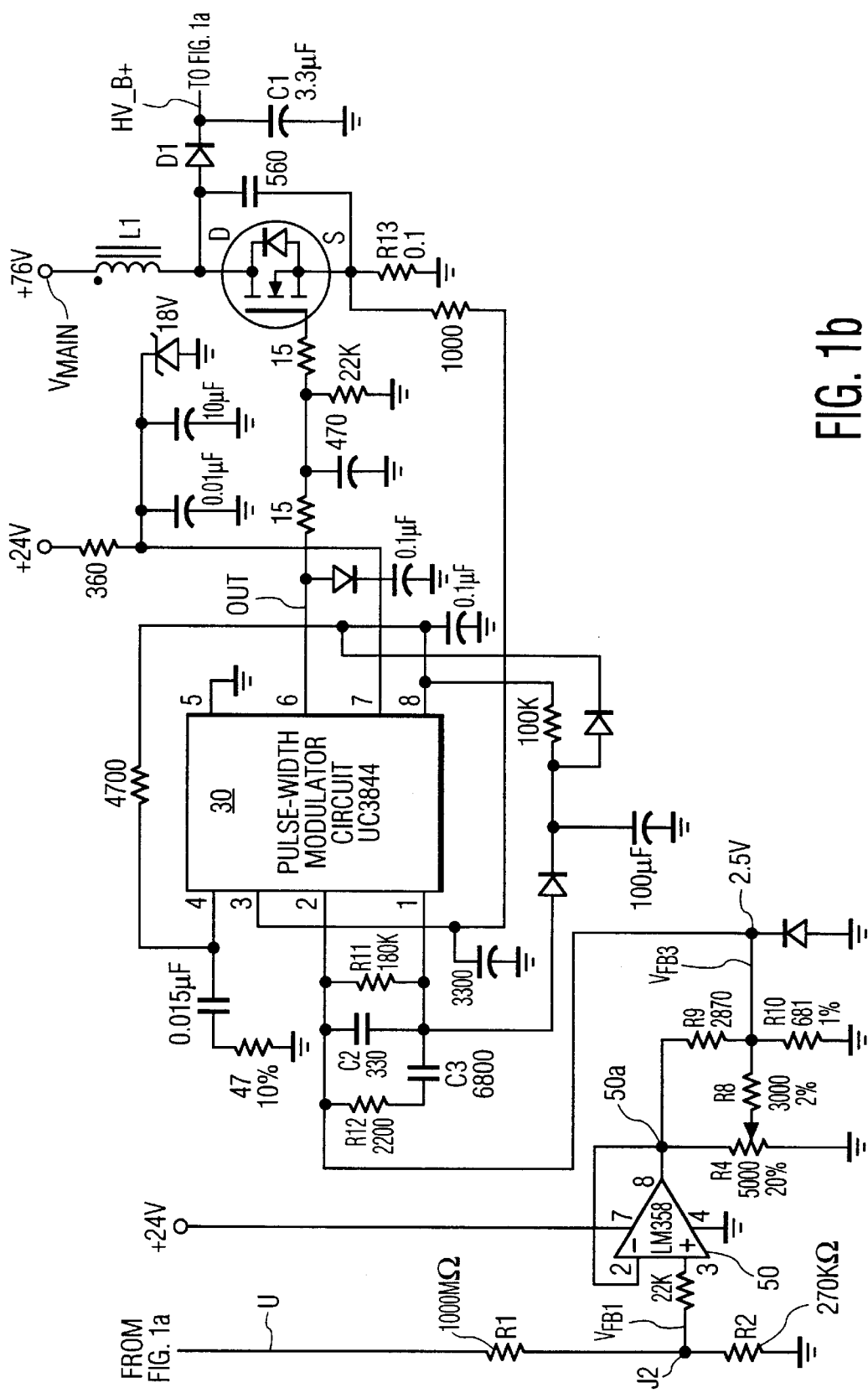
FIG. 1B illustrates a low voltage power supply for energizing the high-voltage power supply of FIG. 1A.

FIG. 1B shows a simplified schematic of a low voltage power supply 20 that generates a boosted voltage HV_B+ for a multi-scan frequency video display monitor/television receiver. Voltage HV_B+ is coupled to a primary winding L6 of an integrated high voltage flyback transformer IHVT of an ultor or high voltage power supply 40 of FIG. 1A, embodying an inventive feature. Similar symbols in FIGS. 1A and 1B indicate similar items or functions. Supply voltage HV_B+ of FIG. 1A varies between approximately 110 V and approximately 200 V over a range of switching frequencies and load conditions of ultor voltage power supply 40.

Flyback transformer IHVT includes a high-voltage winding L5, having winding segments L2, L3, and L4 separated by diodes D2 and D3, is of a split-diode type. High-voltage power supply 40 generates an ultor voltage U in a filter capacitor $C_{ULTOR}$, which is equal to approximately 32 kV. Ultor voltage U is applied to an ultor electrode of a cathode ray tube (CRT) 94.

A phase-lock-loop circuit 60, synchronized to the horizontal deflection frequency, of power supply 40 controls a switching transistor Q2. Winding L6 of transformer IHVT is coupled to a drain electrode of transistor Q2. A flyback capacitor CR is coupled to winding L6 to form a resonant circuit with an inductance of winding L6 in a conventional way for generating high voltage pulses 59 in winding segments L2, L3 and L4.

A regulated supply voltage VMAIN of FIG. 1B, equal to approximately 76 V. Voltage VMAIN is coupled to a primary winding L1 of a transformer T2. A pulse-width modulator circuit 30 controls a switching transistor Q1. Winding L1 of transformer T2 is coupled to a drain electrode of transistor Q1. A voltage rectifying diode D1 that is coupled to the drain electrode of transistor Q1 produces boosted voltage HV_B+ in a filter capacitor C1.

Ultor voltage U is voltage divided by a resistance R1 and a resistance R2, forming together a high resistance bleeder resistor. A resulting negative feedback signal VFB1 at a junction J2 of resistances R1 and R2 is applied to pulse-width modulator circuit 30 through a unity-voltage-gain buffer amplifier 50. Buffer amplifier 50 matches the high source impedance formed by resistances R1 and R2 to the lower input impedance of pulse-width modulator circuit 30. An output voltage 50a of the buffer amplifier 50 is voltage divided by a resistors R9 and a resistor R10 for providing a feedback signal VFB3 to pulse-width modulator circuit 30. The effect of tolerances of circuit components on feedback signal VFB1 are compensated by resistances R7 and R8.

Feedback signal VFB3 developed at a junction between resistors R9 and R8 controls the duty cycle of output pulses OUT of pulse-width modulator circuit 30, thereby controlling the conduction time of transistor Q1 and, thus, the magnitude of voltage HV_B+. Ultor voltage U varies in response to variations of voltage HV_B+. Thus, ultor voltage U increases as voltage HV_B+ increases, and vice versa.

Frequency response of an error amplifier, not shown, of pulse-width modulator circuit 30 is established by a compensation network, formed by a resistor R11, a resistor R12, a capacitor C2 and a capacitor C3, provided between pins 1 and 2 of an integrated circuit (IC) UC3842. IC UC3842 operates as a current-mode controller. IC UC3842 responds to feedback signal VFB1 by changing the duty cycle of its output pulses OUT at pin 6, and hence the conduction time of transistor Q1. Thereby, ultor voltage U is regulated by maintaining feedback signal VFB3 at a 2.5 V reference level of pulse-width modulator circuit 30.

Phase-lock-loop circuit 60 of FIG. 1A includes a conventional IC MC1391 having an internal R-C oscillator, not shown, that generates at pin 1 a signal 60*a*. Signal 60*a* is coupled via a conventional drive circuit 61 formed by a pair of complementary transistors Q3 and Q4 to the gate electrode of transistor Q2. A conventional resistor network 62 formed by an adjustable potentiometer 63 coupled via a resistor 64 to pin 7 of IC MC1391 and a resistor 66 coupled to pin 7 of IC MC1391 control a free running frequency of the aforementioned RC oscillator, not shown.

Flyback pulses 59 of transformer IHVT are coupled from a winding L7 via a conventional signal integrating network formed by a resistor 67, coupled to a parallel arrangement of a resistor 68 and a capacitor 69, and via a coupling capacitor 80 to pin 4 of IC MC1391 to produce a sawtooth signal 81. Signal 81 is coupled to pin 4 of IC MC1391 of a phase detector, not shown. A conventional horizontal deflection circuit 82 produces horizontal retrace pulses 83 that are coupled via an inverting stage formed by a resistor 84, a resistor 85, a transistor Q5, a load resistor 86, a resistor 87 and a coupling capacitor 88 to pin 4 of IC MC1391 of the aforementioned phase detector, not shown. Horizontal deflection circuit 82 operates at a frequency selected from, for example, 1H, 2H and 2.4H, where H is equal to approximately 16 KHz, selected, for example, by a user in corresponding modes of operation.

An output pin 5 of IC MC1391 of the aforementioned phase detector, not shown, is coupled via a resistor 89 to pin 7 of IC MC1391 to control the phase and frequency of output signal 60*a*. Thereby, signal 60*a* is synchronized to the deflection current, not shown, produced by horizontal deflection circuit 82. A low pass filter 90 is coupled to output pin 5 of IC MC1391. The duty cycle of signal 60*a* is controlled by a voltage developed at pin 8 of IC MC1391 that is established by a resistor 97 and a resistor 98, forming a voltage divider.

FIGS. 2*a*, 2*b*, 2*c* and 2*d* illustrates waveforms useful for explaining the operation of high voltage power supply 40 of FIG. 1A. Similar symbols in FIGS. 1A, 1B and 2*a*, 2*b*, 2*c* and 2*d* indicate similar items or functions. Horizontal deflection output stage 82 of FIG. 1A is disabled by a control signal CNT1 of FIG. 2*c* produced in a microprocessor 92 of FIG. 1A for protecting a horizontal output transistor, not shown, during an interval TB-TC having a duration TB-TC of FIG. 2*c*.

The multi-scan frequency video display monitor/television receiver that includes high voltage power supply 40 of FIG. 1A is capable of operating at a deflection frequency selected from a range of frequencies, as indicated before, in accordance with, for example, a selection controlled by a user, referred to as mode change. Mode change can also occur when an input video signal source, not shown, to the multi-scan frequency video display monitor/television receiver has changed, requiring a change in the deflection frequency.

Figure 2A:
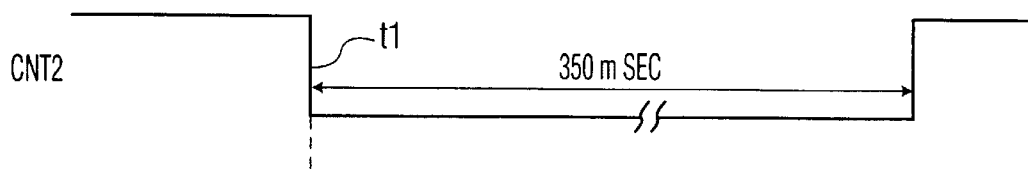
FIGS. 2a, 2b, 2c and 2d illustrate waveforms useful for explaining the operation of the high voltage power supply of FIG. 1A.
Figure 2B:
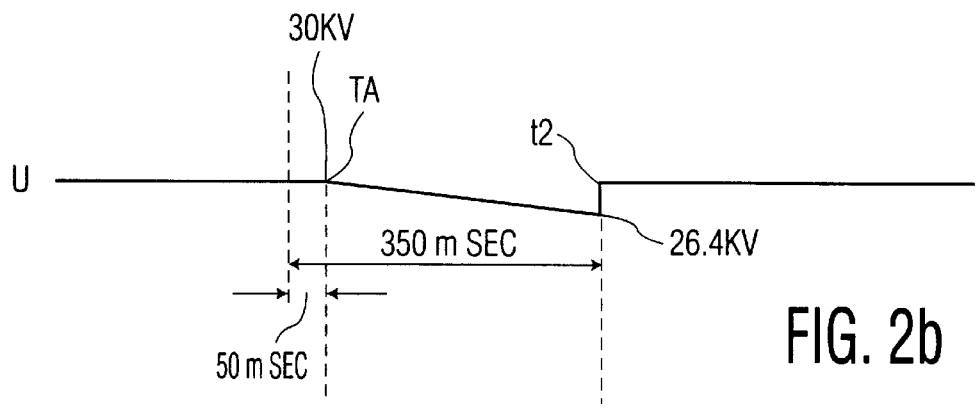
Figure 2C:
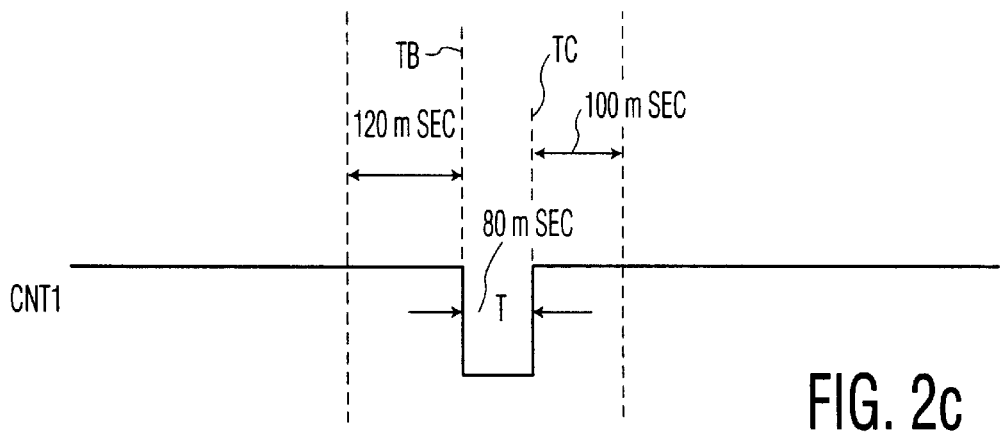

During interval TB-TC of FIG. 2*c*, the mode change occurs. During interval TB-TC, a circuit component such, for example, as an S-shaping capacitor or a linearity inductance, not shown in the FIGURES, is switched out of the circuit and a different one is switched in the circuit to conform with the newly selected mode of operation, in a well known manner.

Horizontal deflection output stage 82 of FIG. 1A is disabled, during mode changing interval TB-TC of FIG. 2*c*. Microprocessor 92 of FIG. 1A generates a control signal CNT2 of FIG. 2*a* that is coupled to a cathode of CRT 94 to blank a screen 93 of CRT 94 of FIG. 1A for providing screen protection, in a conventional way.

Figure 2D:
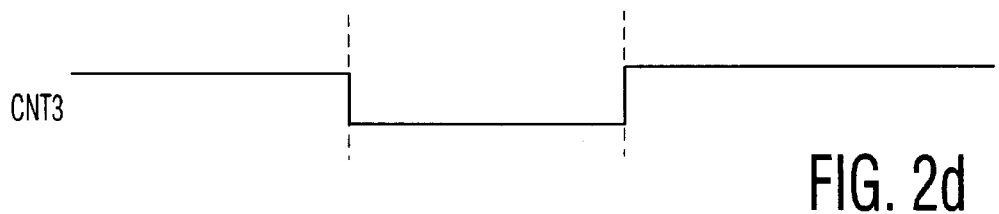

In carrying out an inventive feature, microprocessor 92 generates a control signal CNT3 of FIG. 2*d* from a time t1 of FIG. 2*a*, approximately 120 millisecond prior to interval TB-TC of FIG. 2*c*, to a time t2 of FIG. 2*b*, occurring approximately 100 millisecond after interval TB-TC. Signal CNT3 of FIG. 1A is coupled via a diode 95 coupled in series with a resistor 96 to pin 8 of IC MC1391 for disabling signal 60*a*. Thereby, ultor voltage power supply 40 is disabled from time TA, approximately 50 msec after time t1 of FIG. 2*a* to time t2 of FIG. 2*b*. Therefore, capacitance $C_{ULTOR}$ that develops ultor voltage U partially discharges via a 1 Giga-Ohm bleeder resistor formed by series coupled resistances R1 and R2 of FIG. 1B, from approximlately 50 msec after time t1 of FIG. 2*a* to time t2 of FIG. 2*b*. As a result, ultor voltage U of FIG. 1A has a transient decrease from its normal operation magnitude of 29 KV to about 26.6 KV or a decrease of approximately 2.4 kV from its normal operation magnitude. Advantageously, the transient decrease in voltage U tends to maintain screen 93 of FIG. 1A blanked.

What is claimed is:

1. A video display apparatus, comprising:
   an ultor voltage power supply for generating an ultor voltage at an ultor electrode of a cathode ray tube;
   means for selectively blanking a screen of said cathode ray tube, when a change occurs in a mode of operation of said video display apparatus;
   means for disabling said ultor voltage power supply, when said mode change occurs; and
   means for producing a transient decrease in a magnitude of said ultor voltage, when said ultor voltage power supply is disabled.

2. A video display apparatus according to claim 1 further comprising, a switching transistor responsive to a switching signal for generating high voltage pulses and a rectifier for rectifying said high voltage pulses to develop therefrom said ultor voltage, wherein said ultor voltage magnitude decreasing means comprises a bleeder resistance coupled to a filter capacitance and to said cathode ray tube electrode.

3. A video display apparatus according to claim 2 further comprising, an inductance coupled to said switching transistor to form a switch mode power supply for generating said high voltage pulses, a low voltage power supply responsive to said ultor voltage for generating a low voltage supply voltage that varies in accordance with said ultor voltage and coupled to said inductance for regulating said ultor voltage in a negative feedback manner.

4. A video display apparatus according to claim 1 further comprising, a deflection circuit output stage having a selectable deflection frequency, wherein said transient decrease occurs when said deflection frequency is changed.

5. A video display apparatus according to claim 1 further comprising, a switching transistor responsive to a switching signal for generating high voltage pulses, a rectifier for rectifying said high voltage pulses to develop therefrom said ultor voltage and a first winding of a high voltage transformer coupled to said switching transistor to form a switch mode power supply for generating said high voltage pulses in a second winding of said transformer.

6. A video display apparatus according to claim 5 further comprising, an oscillator for generating said switching signal, wherein said ultor voltage power supply disabling means disables said oscillator.

7. A video display apparatus according to claim 1 further comprising, a deflection circuit output stage having a selectable deflection frequency and a microprocessor for selecting a different deflection frequency to provide for said mode change.

8. A video display apparatus according to claim 7, wherein said mode change occurs in response to a different selection of an input video signal source to said video display apparatus.

9. A video display apparatus according to claim 1 further comprising, a deflection circuit output stage and a microprocessor for generating a first control signal when said mode change is required that is coupled to said ultor voltage power supply to disabled said ultor voltage power supply and a second control signal that is delayed with respect to said first control signal for disabling said deflection circuit output stage after said ultor voltage power supply is disabled.

10. A video display apparatus, comprising:

an ultor voltage power supply for generating an ultor voltage at an ultor electrode of a cathode ray tube;

a deflection circuit output stage; and a microprocessor for generating a first control signal that is coupled to said deflection circuit output stage to normal made operation for controlling a mode change in said deflection circuit output stage when a change in a deflection frequency is required and a second control signal that is coupled to said ultor voltage power supply to disabled said ultor voltage power supply, said first control signal being delayed with respect to said second control signal for disabling said ultor voltage power supply prior to said mode change in said deflection circuit output stage.

* * * * *